(12) United States Patent
Salera

(10) Patent No.: US 12,393,056 B2
(45) Date of Patent: Aug. 19, 2025

(54) PRESCRIPTION SCREEN PROTECTOR

(71) Applicant: Daniel Salera, King of Prussia, PA (US)

(72) Inventor: Daniel Salera, King of Prussia, PA (US)

( * ) Notice: Subject to any disclaimer, the term of this patent is extended or adjusted under 35 U.S.C. 154(b) by 674 days.

(21) Appl. No.: 17/528,864

(22) Filed: Nov. 17, 2021

(65) Prior Publication Data

US 2022/0163818 A1    May 26, 2022

Related U.S. Application Data

(60) Provisional application No. 63/116,328, filed on Nov. 20, 2020.

(51) Int. Cl.

| | |
|---|---|
| *G02C 7/02* | (2006.01) |
| *B32B 7/023* | (2019.01) |
| *B32B 7/12* | (2006.01) |
| *B32B 27/36* | (2006.01) |
| *G02C 7/06* | (2006.01) |

(52) U.S. Cl.
CPC .............. *G02C 7/027* (2013.01); *B32B 7/023* (2019.01); *B32B 7/12* (2013.01); *B32B 27/365* (2013.01); *G02C 7/066* (2013.01); *B32B 2250/02* (2013.01); *B32B 2307/412* (2013.01); *B32B 2307/418* (2013.01); *B32B 2551/00* (2013.01); *B32B 2571/00* (2013.01)

(58) Field of Classification Search
CPC .......... G02C 7/027; G02C 7/066; G02C 3/04; B32B 7/023; B32B 7/12; B32B 27/365; B32B 2250/02; B32B 2307/412; B32B 2307/418; B32B 2551/00; B32B 2571/00; G02B 1/11; G02B 3/0056; G02B 1/14; G02B 25/002

See application file for complete search history.

(56) References Cited

U.S. PATENT DOCUMENTS

| | | | |
|---|---|---|---|
| 6,461,709 B1 * | 10/2002 | Janssen | B32B 17/10009 160/370.21 |
| 2011/0299168 A1 * | 12/2011 | Combs | G02B 1/11 359/601 |
| 2015/0362736 A1 * | 12/2015 | Kowasic | G02B 27/027 359/478 |
| 2017/0060399 A1 * | 3/2017 | Hough | H04L 67/306 |
| 2017/0131544 A1 * | 5/2017 | Chester | G02B 27/0025 |

(Continued)

*Primary Examiner* — Patricia L. Nordmeyer
(74) *Attorney, Agent, or Firm* — Brennan, Manna & Diamond, LLC

(57) ABSTRACT

The present invention relates to a transparent prescription screen protector. The transparent prescription screen protector provides a prescribed corrected power range for a user with a presbyopia vision defect. The screen protector also protects a display screen on which the cover is applied from scratches, breakage and other damage and debris. The screen protector is a multi-layer device, wherein the top layer is touch sensitive and is configured to receive the user's touch input. The bottom layer has an adhesive backing to removably secure the screen protector to the display screen. The intermediate layer has embedded prescription lenses with a prescribed power range and configured to compensate for the farsightedness vision defect of the user, thereby allowing the user to view the content displayed on the display screen clearly.

10 Claims, 5 Drawing Sheets

(56) References Cited

U.S. PATENT DOCUMENTS

| | | | | |
|---|---|---|---|---|
| 2018/0075578 A1* | 3/2018 | Easley | ............... | G06F 3/147 |
| 2019/0094520 A1* | 3/2019 | Kelly | ............... | G02F 1/133526 |
| 2019/0346672 A1* | 11/2019 | Dosanjh | ............... | H04M 1/027 |
| 2020/0259940 A1* | 8/2020 | Arnold | ............... | H04M 1/185 |
| 2021/0281827 A1* | 9/2021 | D'Annunzio | ............... | H04N 13/398 |
| 2021/0360094 A1* | 11/2021 | Bazzi | ............... | H04B 1/3888 |
| 2022/0036505 A1* | 2/2022 | Wright-Sanders | ............... | G06T 3/40 |

* cited by examiner

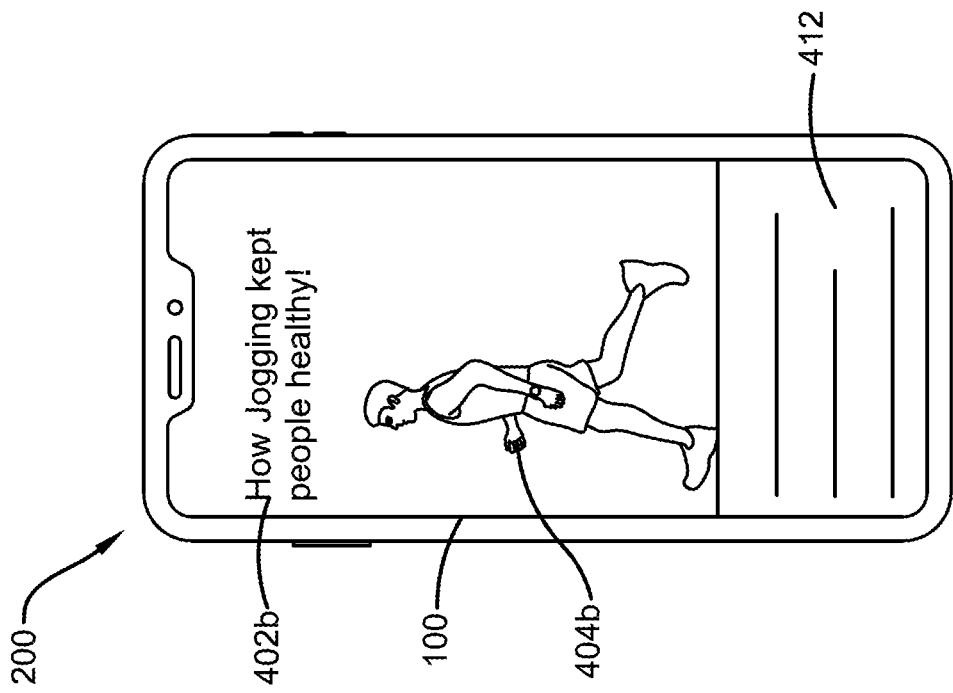
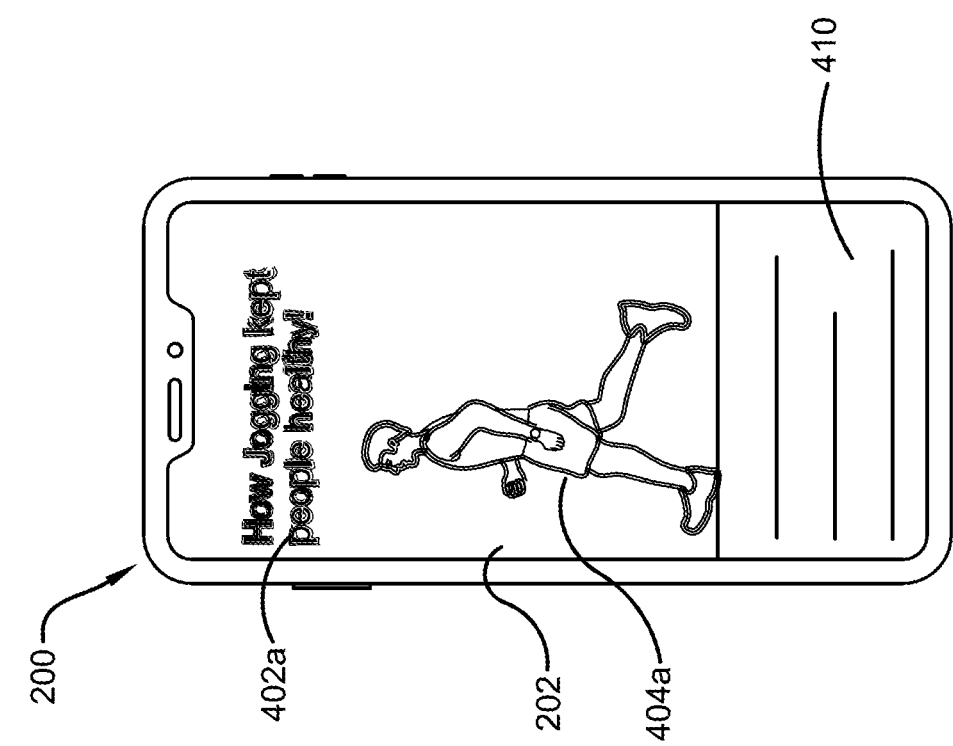

PRESCRIPTION SCREEN PROTECTOR

CROSS-REFERENCE TO RELATED APPLICATION

The present application claims priority to, and the benefit of, U.S. Provisional Application No. 63/116,328, which was filed on Nov. 20, 2020 and is incorporated herein by reference in its entirety.

FIELD OF THE INVENTION

The present invention relates generally to the field of ophthalmic devices such as vision-correcting lenses. More specifically, the present invention relates to a prescription screen protector that can adhere or otherwise be affixed or secured to the screen of smartphones and other electronic devices to allow the users to clearly view the screen and read the information provided thereon without having to wear glasses. The prescription screen protector film ensures protection of the screen of smartphones, tablets, computers, and other electronic devices which are intended to be ready by an individual while simultaneously allowing the users to view the screen with ease and not having to squint or wear corrective lenses. The size and shape of the protector is not limited, and may be available in various sizes to accommodate smartphones, tablets, laptops and other electronic devices. Accordingly, the present disclosure makes specific reference thereto. Nonetheless, it is to be appreciated that aspects of the present invention are also equally applicable to other like applications, devices and methods of manufacture.

BACKGROUND OF THE INVENTION

By way of background, many people suffer from common vision condition such as farsightedness (hyperopia or presbyopia) in which distant objects are seen clearly, however nearby objects are blurry. People suffering from farsightedness or other similar vision conditions may lose their focusing ability and may need prescription glasses to view nearby objects. People may also suffer from nearsightedness, which is the ability to see things close up, but not far away. Hence, television screens, airport monitors and the like may appear blurry to these individuals.

Generally, people use phones, tablets, computers and other electronic devices on a regular basis for reading, web surfing, using applications, educational purposes, working and other tasks which have become commonplace in today's society. People with farsightedness may not be able to clearly view their phone screen or display screens of other electronic devices such as tablets, laptops, computers and more, and the textual matter displayed on the screen seems to be blurred and potentially unreadable. Usually, people with farsightedness use prescription glasses while using devices such as phones, tablets, laptops and more. In case a person forgets to wear his or her prescription glasses while using electronic devices and reading the screen, it can hurt one's eyes due to constant squinting, and cause headaches. Also, some people may not always carry their prescription glasses with them while travelling, and may face difficulty in reading the screen of their electronic devices such as phones, tablets, computers and the like. Also, some people may find it difficult to manage and handle their prescription glasses and may desire to view their phone and other electronic devices without wearing glasses. However, currently no other solution is available in the market to assist the users suffering from farsightedness in reading the textual matter on the screens of electronic devices.

Therefore, there exists a long felt need in the art for a device that helps people suffering from farsightedness in viewing nearby objects. There is also a long felt need in the art for a device that can be used with various electronic devices such as smartphones, tablet devices, laptops and other devices for assistance in clearly reading the screen. Additionally, there is a long-felt need in the art for a device that can be adhered, affixed or otherwise associated with the screen of the electronic devices and does not require the user to carry the device separately, thereby eliminating the chances of forgetting the viewing assistance device while travelling. Moreover, there is a long-felt need in the art for a device that eliminates the need for prescription glasses for reading screens of electronic devices by people suffering from a farsightedness vision condition. Further, there is a long-felt need in the art for a device that prevents the users from suffering from any headaches, eye irritation or other similar conditions in case the user does not wear prescription glasses while reading the screen of phones or other devices. Finally, there is a long-felt need in the art for a device that is easy to use and allows the users to view the phone screen or other display screen without needing to wear corrective lenses to clearly see what is present on the screen.

The subject matter disclosed and claimed herein, in one embodiment thereof, comprises a transparent prescription screen protector. The transparent prescription screen protector is configured to provide the prescribed corrected power range for a viewer with a presbyopia vision defect while protecting the display screen from scratches, breakage and debris. More specifically, the prescription screen protector includes a top layer, a bottom layer and an intermediate layer having one or more lenses. The screen protector is positioned to be on or substantially cover the display screen of a handheld or other device having a display. The top layer is touch sensitive and is configured to receive the viewer's touch input. The bottom layer has an adhesive backing to removably secure the protective cover and viewing assist device to the display screen. The intermediate layer has embedded prescription lens(es) with a prescribed power range and configured to compensate for the farsightedness vision defect of the viewer, thereby allowing the viewer to view the content displayed on the display screen clearly without requiring the wearing of any corrective glasses.

In this manner, the novel prescription screen protector device of the present invention accomplishes all of the forgoing objectives, and provides a relatively easy and convenient solution to read the screen of electronic devices such as phones, tablet devices, laptops, and more by people who face difficulty in viewing nearby objects. The prescription screen protector device of the present invention is also user-friendly, as it does not require the users to wear prescription glasses while reading the screen and prevents the users from having any headache or eye irritation in case the user do not wear prescription glasses while reading screen. Additionally, the prescription screen protector device protects the screen of the electronic devices and simultaneously allows the users to clearly read the screen of electronic devices.

SUMMARY OF THE INVENTION

The following presents a simplified summary in order to provide a basic understanding of some aspects of the disclosed innovation. This summary is not an extensive overview, and it is not intended to identify key or critical elements or to delineate the scope thereof. Its sole purpose is to present some general concepts in a simplified form as a prelude to the more detailed description that is presented later.

The subject matter disclosed and claimed herein, in one embodiment thereof, comprises a transparent prescription screen protector. The transparent prescription screen protector is configured and designed to provide prescribed prescription corrective range for a viewer while protecting a display screen from scratches, breakage and debris. The prescription screen protector further includes a number of layers, such as a top layer, a bottom layer and an intermediate layer having a plurality of lenses integral therewith. The various layers do not interfere with the touch-sensitive capabilities of the device, which are configured to receive the viewer's touch input. The bottom layer has an adhesive covered by a backing layer to removably secure to the display screen. The adhesive layer is clear so as to not interfere with or distort the touch-sensitive characteristics of the operation of the device. The intermediate layer has one or more embedded prescription lenses with the prescribed corrective range and configured to compensate for the farsightedness vision defect of the viewer, thereby allowing the viewer to view the content displayed on the display screen clearly and without requiring wearing any correction glasses. The intermediate layer may be bifurcated into two different lens types, which would allow the user to set up different display characteristics on the electronic device, such as text at a lower portion of the display screen and images, graphs or other information at the top of the screen, such as one may have in viewing stock market activities. The top layer has an anti-glare coating and can be touch insensitive for devices that do not have touch-sensitive display screen. Further, the top layer, the intermediate layer and the bottom layer cannot be separated and are permanently laminated.

The screen protection capability provided by the prescription cover is useful to people who place their handheld devices in a handbag or pocket, where the devices can be easily scratched by other objects. The prescription screen protector also enhances the view of the display screen allowing the users to comfortably view the content on the screen without the aid of external eyewear, contacts and other visual aids. The power range of the lenses can be customized to meet the requirements of the users and the screen protector can be commercially available for a wide range of prescribed powers and for a range of handheld devices. In addition, different areas or zones of the lens can be created to allow users to view different sizes of information on their particular screen.

In a further embodiment of the present invention, a transparent touch screen protector for an electronic device is disclosed. The transparent touch screen protector includes a plurality of embedded lenses with a prescribed power or corrective range to compensate for the vision defect of a viewer and make the display easier to see. Each lens is a tiny lens embedded within the cover and is configured to refract the light emitting from a display screen on which the screen protector is applied. Further, the transparent touch screen protector has a bottom adhesive layer having a transparent adhesive to removably secure the protector to the display screen. The transparent touch screen protector covers the complete display screen or only portions of the electronic device and protects the display screen from scratches, breakage and debris. A top layer can receive user input to operate the touch sensitive display screen of the handheld device. The intermediate layer may not be fully coextensive with the top or bottom layers or alternatively, the intermediate layer may only have a portion dedicated to a corrective lens and the remainder may be clear.

In a further embodiment of the present invention, a novel screen protector device is disclosed. The screen protector device is configured to cover and protect the touch-sensitive display screen of an electronic device. Further, the protector device allows a user to operate a touch-sensitive display screen of an electronic device using a touch sensitive top layer and the protector device is removably attached to the touch-sensitive display screen using a transparent adhesive layer. Thousands of nano lenses embedded in the protector device have a prescribed power range to compensate for a presbyopia vision defect of a viewer of the touch sensitive display screen allowing the viewer to view clear content on the display screen.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which:

FIG. 4A illustrates a perspective view of content being displayed on a display screen of a handheld electronic device as viewed by a user having farsightedness;

FIG. 4B illustrates a perspective view of the same content being displayed on the display screen of the handheld electronic device as in FIG. 4A, but having one potential embodiment of the prescription screen protector device of the present invention applied thereto in accordance with the disclosed architecture;

DETAILED DESCRIPTION OF THE PRESENT INVENTION

Figure 1:
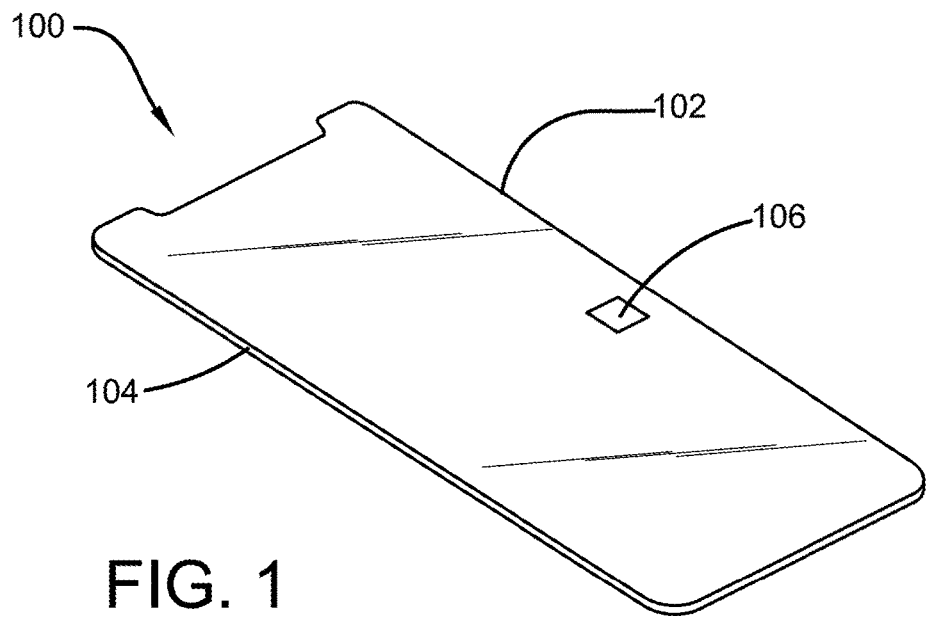
FIG. 1 illustrates a perspective view of one potential embodiment of a prescription screen protector device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a device that helps people suffering from farsightedness in viewing nearby objects. There is also a long-felt need in the art for a device that can be used with various electronic devices such as smartphones, tablet devices, laptops and other devices for clearly reading the screen. Additionally, there is a long-felt need in the art for a device that can be adhered to the screen of the electronic devices and does not require the user to carry the device separately, thereby eliminating the chances of forgetting the device while travelling. Moreover, there is a long-felt need in the art for a device that eliminates the use of prescription glasses for reading a screen of electronic devices by people suffering from a farsightedness vision condition. Further, there is a long-felt need in the art for a device that prevents the users from suffering from any headaches, eye irritation or other similar conditions in case the user does not wear prescription glasses while reading the screen of phones or other devices. Finally, there is a long-felt need in the art for a device that is easy to use and allows the users to view the phone screen or other display screens without needing to wear corrective lenses.

The present invention, in one exemplary embodiment, a novel transparent touch screen protector for an electronic device is disclosed. The transparent touch screen protector includes a plurality of embedded lenses with prescribed power or corrective range to compensate for the vision defect of a viewer. Each lens is a tiny lens embedded within the cover and is configured to refract the light emitting from a display screen on which the screen protector is applied. Further, the transparent touch screen protector has a bottom adhesive layer having a transparent adhesive, covered with a removable liner, to removably secure the protector to the display screen once the adhesive is exposed by the liner. The transparent touch screen protector covers some or the complete display screen of an electronic device and protects the display screen from scratches, breakage, and debris. A top layer can receive user input and does not interfere with the touch sensitive characteristics so as to operate the touch sensitive display screen of the handheld device.

For the present invention and the disclosed embodiments, it is contemplated that the electronic device or handheld device on which the screen protector of the present invention is applied and used has a touch-sensitive screen which allows a user to operate the electronic device. The user may depress various electronic buttons, keys, etc. electronically displayed on the touch sensitive screen to operate the electronic device to view content, play video, navigate, start applications, etc. The display screen can also be touch-insensitive as in case of portable laptops and few other handheld devices and is used for only viewing the content displayed on the display screen.

Referring initially to the drawings, FIG. 1 illustrates a perspective view of one potential embodiment of a prescription screen protector device 100 of the present invention in accordance with the disclosed architecture. More specifically, the screen protector 100 of the present invention is configured and dimensioned to adhere to a display screen of an electronic device and cover all or a portion of the display screen. The screen protector 100 has a top touch-sensitive protective layer 102 and a bottom adhesive layer 104. The bottom layer 104 has a transparent adhesive layer to adhere to the display screen of the electronic device such as a smartphone, tablet or the like.

The screen protector 100 has a plurality of lenses between the top layer 102 and the bottom layer 104. In FIG. 1, the lenses are shown virtually as cross-section of the vertical lines and the horizontal lines. It should be appreciated that the cover 100 can have thousands or tens of thousands of lenses integrated in the cover 100. The lenses are integrated as per a prescribed corrective power. An exemplary lens 106 is shown that refracts the light rays coming from the display screen allowing a viewer to read the content shown on the display screen clearly. Integrated lenses of the screen protector 100 have corrective power as per a prescription allowing people with farsightedness (hyperopia or presbyopia) to easily read and view the content shown on the display screen. The screen protector 100 comes in different ranges of prescription allowing people to choose the screen protector 100 needed to reach a 20/20 vision level. In preferred embodiment, a single screen cover 100 can cover a range of prescriptions to address or include, for example, nearsightedness, blue screen, etc.

The lenses are integrated within the screen cover 100 and are nano in size. In one embodiment, the lens can be a Fresnel lens that acts as a convex lens for correcting farsightedness of a viewer. The person using an electronic device with screen cover 100 of the correct prescription can read the displayed content without wearing correcting glasses. The screen cover 100 does not cause eye strain and does not cause a headache to the viewer of the display screen. The lenses compensate for the vision defect i.e., farsightedness of a person and allow the person to read the content displayed on the touch-sensitive display screen without the need for glasses. It should be noted that a person can read the content easily while wearing the glasses as well.

The screen protector 100 is transparent and can be made up of plastic, polycarbonate, vinyl, acrylic, polystyrene or durable glass. The screen cover 100 is sufficiently hard or stiff so that it does not bend or collapse under its own weight, to contact the screen of a handheld device when the protector is applied horizontally onto the handheld device. The screen cover 100 is thin enough to allow the operation of the top layer 102. A user can seamlessly operate the touch-based display screen of the handheld device by performing touch operation using the cover 100.

The top layer 102 may be coated to have an anti-glare or anti-reflective coating. This reduces static effects and allows the fingers and thumb to move smoothly on the top layer 102 of the screen protector 100. The adhesive layer 104 of the cover 100 has sufficient adhesiveness or tackiness to mount the screen protector 100 onto display surface of the handheld device, but enables the removal without leaving any adhesive residue on the device. The adhesive layer is covered with a release layer or liner such as a silicone coated sheet which is peeled off, exposing the adhesive prior to application to the screen of the display device.

Figure 2A:
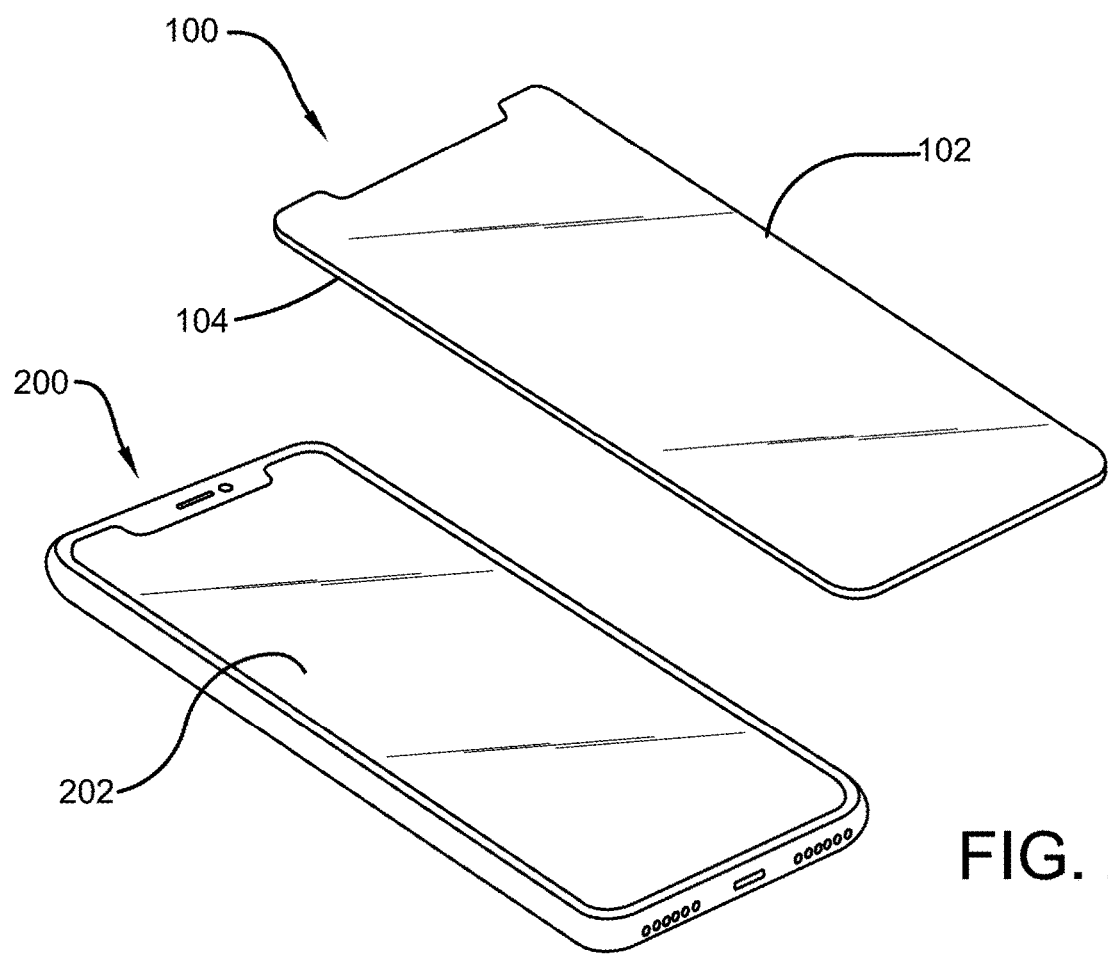
FIG. 2A provides a perspective view of one potential embodiment of the prescription screen protector device of the present invention about to be applied to an electronic device in accordance with the disclosed architecture.

FIG. 2A provides a perspective view of one potential embodiment of the prescription screen protector device 100 of the present invention about to be applied to an electronic device 200 in accordance with the disclosed architecture. More specifically, the screen protector 100 is designed and configured to adhere to and cover the touch display 202 of the handheld device 200. The bottom layer 104 of the screen protector 100 has an adhesive backing and is placed horizontally on the touchscreen 202 to cover the touchscreen 202. The cover 100 is transparent and does not impede or otherwise interfere with the display. A user can operate the touchscreen 202 by performing touch operations on the top layer 102 of the cover 100. The touch operations on the top layer 102 provide a smooth operation on the touchscreen 202. Lenses with a correct prescription embedded within the cover 100 allow the light emitting from the display screen or touchscreen 202 to be refracted in a manner which is similar to that of by farsightedness correcting glasses. Accordingly, the lenses allow a person with a farsightedness vision defect to clearly read the content displayed on the touchscreen 202 without wearing any correction/prescription glasses or lenses.

Based on the preference of a user, the cover 100 with embedded lenses of prescribed range of corrective power can be selected to be applied on the display screen or touchscreen 202 of the handheld device 200. The screen protector 100 protects the touchscreen 202 from any physical damage such as scratches while allowing the user to easily view the screen 202.

The protective cover 100 comes with embedded corrective lenses across the cover body and may come with a protective liner to protect the cover 100 from physical damage. Alternatively, the lenses may be applied only in select portions of the cover depending on the configuration required by the user. To apply, the protective liner can be removed and the cover 100 can be applied on the touchscreen of a handheld device and held in place by the adhesive. Alternatively, the screen can be held in position by a static cling vinyl sheet arrangement.

The top layer 102 is generally scratch-less and tamper-resistant. Further, the top layer 102 also protects the embedded lenses from any damage. However, during use of the electronic device 200, the top layer 102 may become dented, scratched, or otherwise damaged such that viewing through the cover 100 may be unacceptable, then the cover 100 can be easily replaced with a new cover of same or different prescription.

Figure 2B:
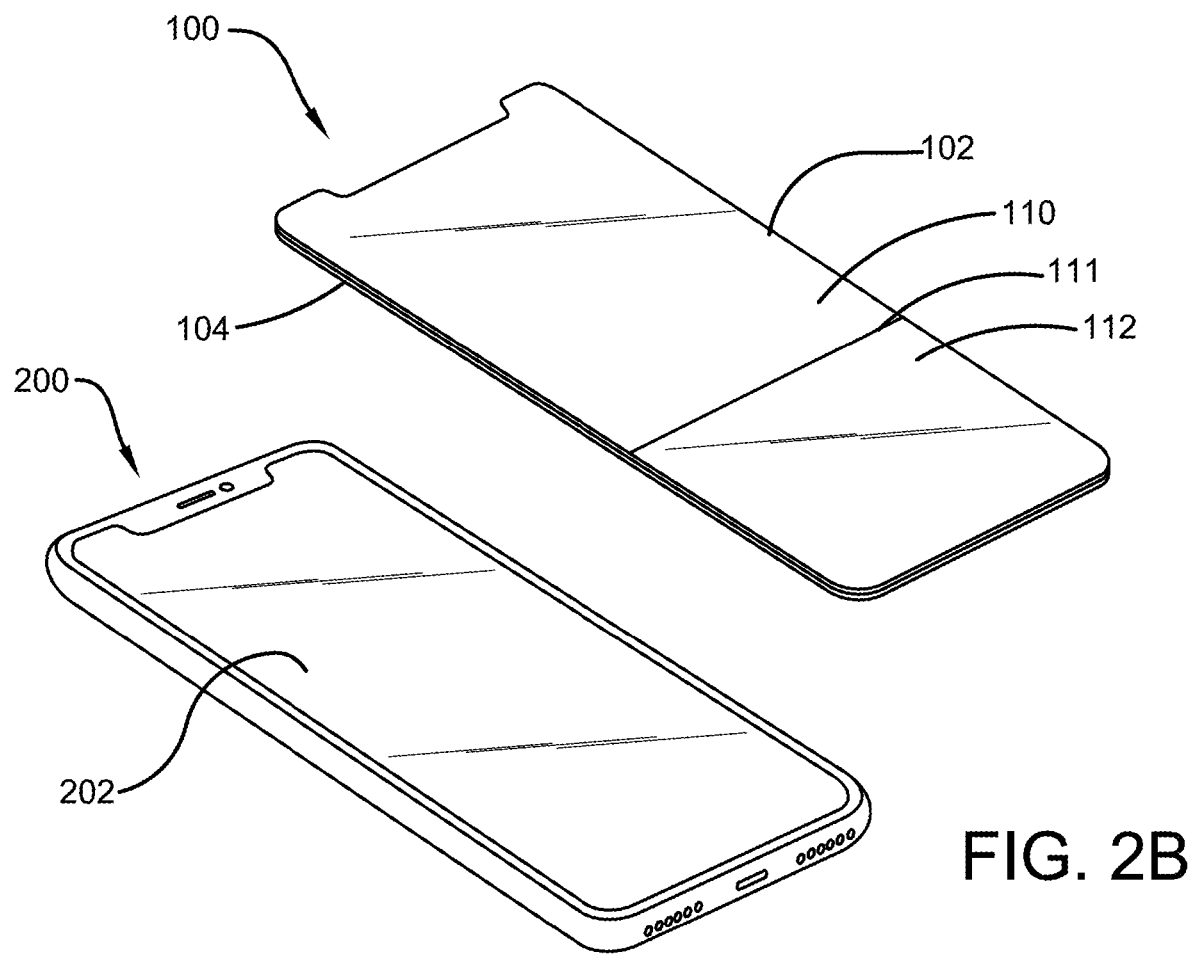
FIG. 2B provides a perspective view of another potential embodiment of the prescription screen protector device of the present invention about to be applied to an electronic device in accordance with the disclosed architecture, wherein the prescription screen protector device is bifurcated.

FIG. 2B provides a perspective view of another potential embodiment of the prescription screen protector device 100 of the present invention about to be applied to an electronic device 200 in accordance with the disclosed architecture, wherein the prescription screen protector device 100 is bifurcated. More specifically, the top portion 110 has the corrective lens, and the lower portion 112 is clear or lens free. The sections are separated by line 111. Of course, the top portion 110 can be clear and the bottom portion 112 can have the corrective lens, depending on the particular set-up the individual has on his or her electronic device. Alternatively, lenses of different corrective powers can be used, with one portion of the cover having a first lens and the second portion of the cover having a second lens.

Figure 3:
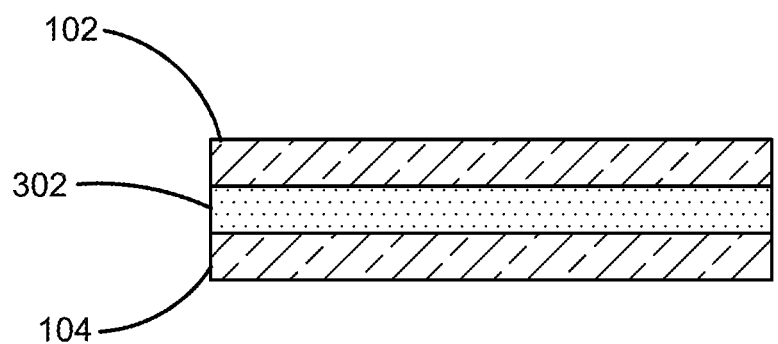
FIG. 3 illustrates a sectional view of the various layers of one potential embodiment of the prescription screen protector device of the present invention in accordance with the disclosed architecture.

FIG. 3 illustrates a sectional view of the various layers of one potential embodiment of the prescription screen protector device 100 of the present invention in accordance with the disclosed architecture. The prescription screen protector 100 is both relatively thin and lightweight. The protector 100 may have a thickness of between about 0.2 and 1 mm. The top layer 102 is a touch-sensitive layer and has an anti-glare or anti-reflective (A/R) coating. The top layer 102 receives a user touch to allow the user to operate the touchscreen of a handheld device. The top layer 102 may have a thickness of between about 0.05-0.3 mm. The top layer 102 makes sure that touch and sensitivity functions of the handheld device on which the cover 100 is applied are not compromised.

The bottom layer 104 has a transparent adhesive, removable or repositionable layer to adhere to the touchscreen of the electronic device. The adhesive layer 104 allows the cover 100 to be removably secured to the touchscreen or display screen. A user affixes or otherwise attaches the cover 100 to a display screen by aligning the cover 100 with the display screen of an electronic or handheld device and then gently pressing the cover 100 downward to make a secure attachment of the adhesive layer or form a static or frictional cling to the display screen.

Lenses 106 are embedded between the top layer 102 and the bottom layer 104. Alternatively, the lenses 106 can be embedded either in the top layer 102 or the bottom layer 104. The lens layer 302 corrects the view of the screen for a user with a vision defect such as farsightedness, allowing users to comfortably view text, images and video on the screen of the electronic device without the aid of external eyewear, contacts and other visual aids.

The screen protector minimizes unwanted internal reflection and haze, and maximizes transmissions of the display screen through the use of anti-glare or anti-reflective coatings. The layers 102, 104, 302 and the adhesive absorb impact shock caused when an electronic device on which the screen protector is applied is dropped or the touch-sensitive screen hits a solid object. Further, the flexibility of the layers maintains the tactile response for the touch-sensitive screen.

FIG. 4A illustrates a perspective view of the content being displayed on a display screen of a handheld electronic device 200 as viewed by a user having farsightedness. More specifically, when a user with farsightedness is not wearing correcting glasses and views the content on the display screen, the content appears to be unclear and is slightly blurry. As shown, the text 402a and an image 404a displayed on the display screen 202 appear to be blurry to the user having farsightedness. Also, the eyes of the user hurt and can cause headaches while viewing the blurred content on the display screen. The display screen may also have a pre-set or pre-established textual area 410 which may require a second lens type in the intermediate layer to view the textual information.

By comparison, FIG. 4B illustrates a perspective view of the same content being displayed on the display screen of the handheld electronic device 200 as in FIG. 4A, but having one potential embodiment of the prescription screen protector device 100 of the present invention applied thereto in accordance with the disclosed architecture. More specifically, the embedded lenses of the transparent protector 100 compensate for the vision defect of the viewer of the handheld device 200. The embedded lenses refract the light emitting from the display screen 202, thus making the content displayed on the screen 202 clear. As shown, once the cover 100 is applied on the screen, the text 402a of FIG. 4a appears clear (denoted as 402b). Similarly, the image 404a of FIG. 4A appears clear (denoted as 404b) to the viewer.

The display screen may also have a textual area 412 which may require a second lens type or zone in the intermediate layer to view the textual information. Such a configuration creates a bifocal type of effect, with the cover having first and second lens zones. Alternatively, a trifocal arrangement of the lenses can be created in order to show different parts of the screen or to allow multiple users to view the screen. Further, the user or viewer does not need to wear prescription glasses or lenses. The screen protector 100 allows the viewer to clearly view the displayed content while protecting the screen from any physical damage.

Figure 5:
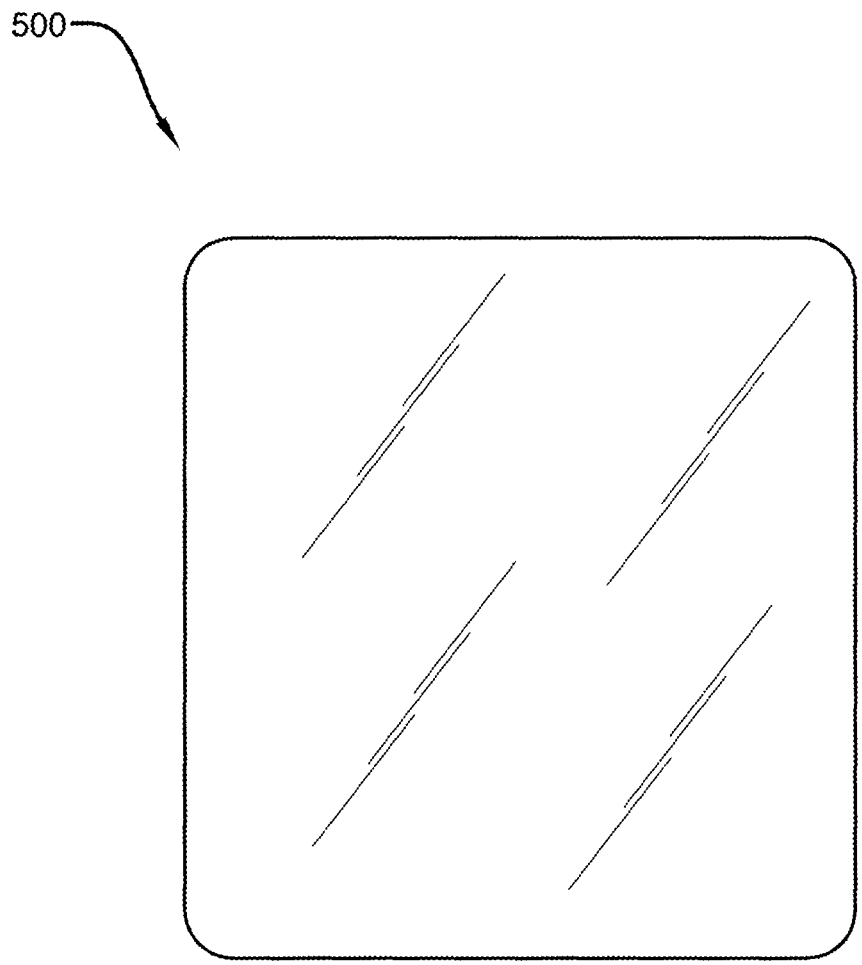
FIG. 5 illustrates a perspective view of another potential embodiment of the prescription screen protector device of the present invention in accordance with the disclosed architecture.

FIG. 5 illustrates a perspective view of another potential embodiment of the prescription screen protector device 500 of the present invention in accordance with the disclosed architecture. The prescription screen protectors 100, 500 of the present invention can be commercially available for a range of digital devices from smartphones, tablets, computers and e-readers to cash registers and car dashboards. In the present embodiment, the prescription screen protector 500 is designed and configured to be placed on the display screen of a tablet. The prescription screen protector 500 is transparent and has embedded prescription lenses to compensate for the vision defect of a viewer of the tablet.

Figure 6:
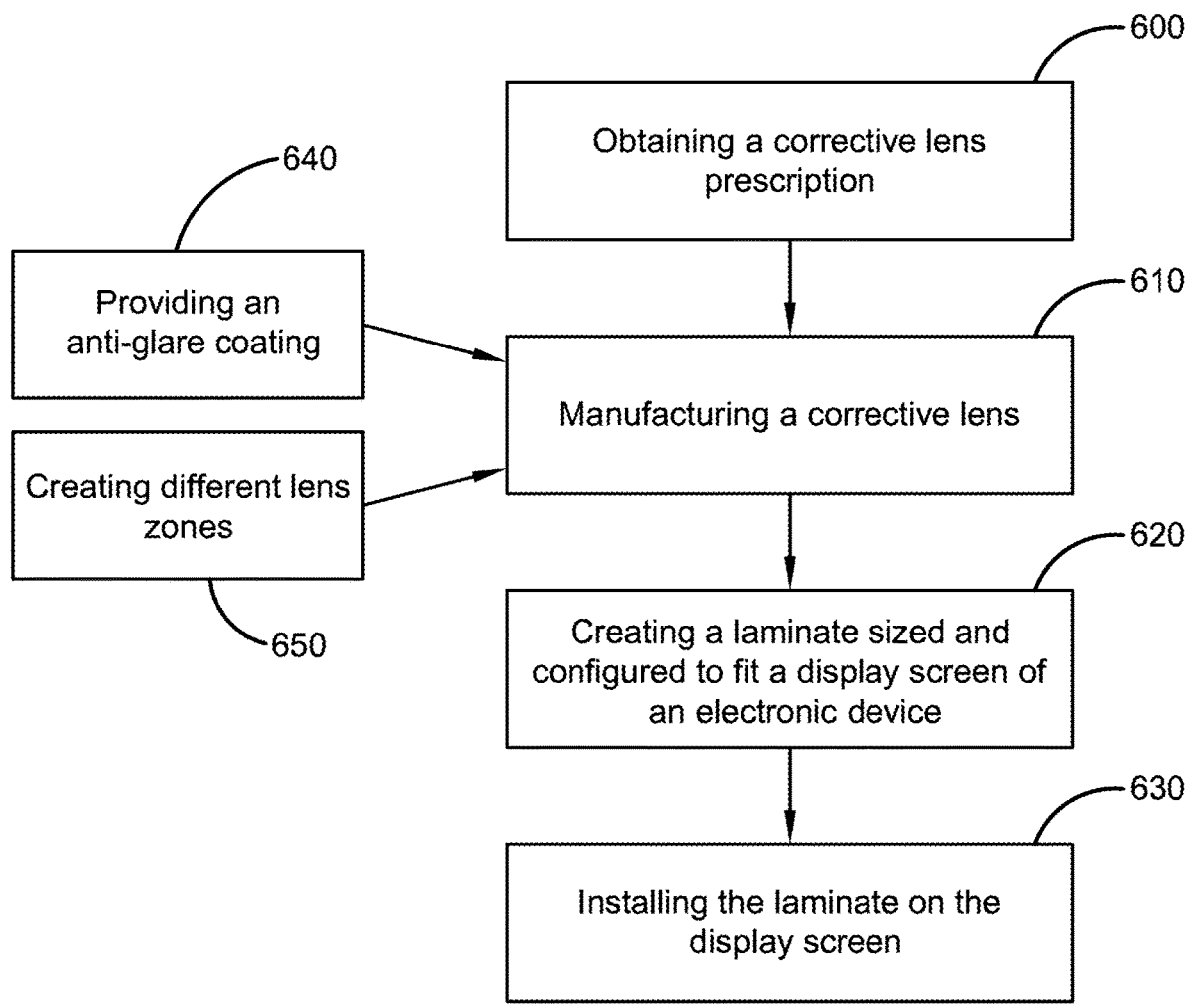
FIG. 6 illustrates a block diagram of an exemplary method of making the prescription screen protector device of the present invention in accordance with the disclosed architecture.

FIG. 6 illustrates a block diagram of an exemplary method of making the prescription screen protector device 100, 500 of the present invention in accordance with the disclosed architecture. Initially, at step 600, a prescription for corrective lenses is obtained. Then, at step 610, the prescription is used to make a prescription lens for a user. At step 620, a laminate is created which incorporates the prescription lens. At step 630, the prescription laminate is installed over a display screen. Additional steps may include a step 640 of applying an anti-glare or anti-reflective coating and/or a step 650 of creating different lens zones, such as a first zone and a second zone on the prescription lens.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "prescription screen protector device", "transparent prescription screen protector", "screen protector", "protector", and "cover" are interchangeable and refer to the prescription screen protector 100, 500 of the present invention.

Notwithstanding the forgoing, the prescription screen protector 100, 500 the present invention can be of any suitable size and configuration as is known in the art without affecting the overall concept of the invention, provided that it accomplishes the above-stated objectives. One of ordinary skill in the art will appreciate that the size, configuration, and material of the prescription screen protector 100, 500 as shown in the FIGS. are for illustrative purposes only, and that many other sizes and shapes of the prescription screen protector 100, 500 are well within the scope of the present disclosure. Although the dimensions of the prescription screen protector 100, 500 are important design parameters for user convenience, the prescription screen protector 100, 500 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A prescription screen protector comprising:
    a prescription lens sized and configured to be applied over a display screen for an electronic device, the prescription lens provided in an intermediate layer, the intermediate layer having a first side and a second side;
    a cover layer disposed over the intermediate layer on the first side, wherein the cover layer is a polystyrene cover comprising an anti-reflective coating;
    a base layer provided over the intermediate layer on the second side, wherein the base layer comprises an adhesive layer; and
    a silicon coated sheet; and
    wherein the silicon coated sheet is configured to removably cover the adhesive layer.

2. The prescription screen protector as recited in claim 1, wherein the adhesive layer is one of a removable adhesive or a repositional adhesive.

3. The prescription screen protector as recited in claim 1, wherein the intermediate layer is comprised of one or more lens areas.

4. The prescription cover lens as recited in claim 1, wherein the cover layer is sized and configured for one of a smartphone, a tablet, a computer or a display screen.

5. The prescription cover lens as recited in claim 1, wherein the adhesive layer is transparent.

6. The prescription cover lens as recited in claim 1, wherein the cover layer does not interfere with a touch screen functionality of the display screen.

7. An electronic display screen and a corrective lens cover combination comprising:
    an electronic device having a display screen; and
    a display screen cover, the display screen cover having a corrective lens layer positioned between a top layer and a bottom layer, wherein the top layer is comprised of an anti-reflective coating and the bottom layer is comprised of an adhesive layer; and
    wherein the top layer further comprises a polystyrene material; and
    wherein the adhesive layer is one of a repositional adhesive or a removable adhesive, and further wherein the adhesive layer is covered by a silicone coated sheet.

8. The electronic display screen and a corrective lens cover combination as recited in claim 7, wherein the corrective lens layer is comprised of a first zone and a second zone.

9. The electronic display screen and a corrective lens cover combination as recited in claim 8, wherein the first and second zones are different from one another.

10. The electronic display screen and a corrective lens cover combination as recited in claim 7, wherein the adhesive layer is transparent.

\* \* \* \* \*